US011325001B2

(12) United States Patent
Vollbrecht et al.

(10) Patent No.: US 11,325,001 B2
(45) Date of Patent: May 10, 2022

(54) IMMERSIVE AND REACTIVE GAME PLAY RANGE, SYSTEM AND PROCESS

(71) Applicant: FLYINGTEE TECH, LLC, Jenks, OK (US)

(72) Inventors: James Vollbrecht, Jenks, OK (US); Jeremy Mathew Carver, Millcreek, UT (US); John Vollbrecht, Jenks, OK (US)

(73) Assignee: FLYINGTEE TECH, LLC, Jenks, OK (US)

( * ) Notice: Subject to any disclaimer, the term of this patent is extended or adjusted under 35 U.S.C. 154(b) by 306 days.

(21) Appl. No.: 16/372,304

(22) Filed: Apr. 1, 2019

(65) Prior Publication Data

US 2019/0299057 A1    Oct. 3, 2019

Related U.S. Application Data

(60) Provisional application No. 62/650,773, filed on Mar. 30, 2018.

(51) Int. Cl.
*A63B 24/00* (2006.01)
*G06T 7/20* (2017.01)

(52) U.S. Cl.
CPC ............ *A63B 24/0021* (2013.01); *G06T 7/20* (2013.01); *A63B 2024/0034* (2013.01); *G06T 2207/30241* (2013.01)

(58) Field of Classification Search
CPC .. A63B 24/0021; A63B 2024/003; G06T 7/20
(Continued)

(56) References Cited

U.S. PATENT DOCUMENTS 5,354,063 A * 10/1994 Curchod ............ A63B 69/3623
                                                    473/155
2009/0023509 A1 * 1/2009 Park .................... A63B 69/3691
                                                    473/159
(Continued)

FOREIGN PATENT DOCUMENTS

CN           1557517 A      12/2004
CN         201249008 Y       6/2009
(Continued)

OTHER PUBLICATIONS

PCT/US2019/025248 International Search Report and Written Opinion, Immersive and Reactive Game Play Range, System and Process.
(Continued)

*Primary Examiner* — John E Simms, Jr.
*Assistant Examiner* — Rayshun K Peng
(74) *Attorney, Agent, or Firm* — Crowe & Dunlevy, P.C.

(57) ABSTRACT

The invention generally relates to an immersive and reactive game play system and process having a dynamic, interactive range surface and/or an end-of-range display that provide for a partially simulated environment with a shared field of play for the activity that allows for an immersive but shared view of each user and the other users, and further expands participation by combining the advantages of simulated display with a physical field of play. The immersive and reactive game play system and process is configured to simultaneously display flight paths of multiple balls struck from a multi-level, multi-bay golf and entertainment facility. The interactive range surface provides a visual, auditory and/or physical effect to a golf ball traveling over or landing on the range surface, and the end-of-range display is configured to display the continued flight path of the golf ball.

70 Claims, 11 Drawing Sheets

(58) Field of Classification Search
USPC .......................................................... 473/156
See application file for complete search history.

(56) References Cited

U.S. PATENT DOCUMENTS

| | | | | |
|---|---|---|---|---|
| 2009/0298649 A1* | 12/2009 | Dyer | .................. | A63B 24/0003 482/4 |
| 2016/0059072 A1* | 3/2016 | Vollbrecht | ......... | A63B 24/0021 473/156 |
| 2017/0300755 A1 | 10/2017 | Bose et al. | | |
| 2019/0099655 A1* | 4/2019 | Park | ................... | A63B 69/3623 |

FOREIGN PATENT DOCUMENTS

| | | |
|---|---|---|
| CN | 201415042 Y | 3/2010 |
| JP | 3136917 U | 10/2007 |
| KR | 20110125526 A | 11/2011 |
| KR | 1020110125526 A | 11/2011 |
| KR | 20150084550 A | 7/2015 |
| KR | 1020150084550 A * | 7/2015 |
| KR | 1020150084550 A | 7/2015 |
| KR | 101712838 B1 | 3/2017 |
| KR | 20170074042 A | 6/2017 |
| KR | 1020170074042 A * | 6/2017 |

OTHER PUBLICATIONS

Office Action received from the Chinese Intellectual Property Office dated May 25, 2021 in connection with corresponding Chinese Application No. 201980035811.6.

* cited by examiner

IMMERSIVE AND REACTIVE GAME PLAY RANGE, SYSTEM AND PROCESS

CROSS REFERENCE TO RELATED APPLICATIONS

The application claims the benefit of and priority to U.S. Provisional Patent Application No. 62/650,773 filed Mar. 30, 2018, and incorporates by reference said provisional application in its entirety.

BACKGROUND OF THE INVENTION

1. Field of the Invention

This invention generally relates to an immersive and reactive game play system and process provides for a partially simulated environment with a shared field of play for the activity that allows for an immersive but shared view of each user and the other users, and further expands participation by combining the advantages of simulated display with a physical field of play.

2. Description of the Related Art

Attempts to simulate physical activities on a personal computer began with the use of simplified, universal controls, such as a keyboard and/or mouse. Improvements in computational power and graphics processing have made simulations more accurate while presenting the end-user with a more "life-like" look and feel. As a result, general and popular interests in virtual or simulated activities have soared, and, particularly in the case of sports and games with physical-world analogues, more sophisticated and activity-specific inputs have proliferated.

By offering an authentic experience to the end-user, many "simulator" sports have become quite popular and typically pair the actual equipment normally used in the sport (as the user's method of input) with an entirely virtual instance of the sport's playing field. As a result, in the example of golf, a golfer may play an accurate but simulated version of a famous golf courses in her basement, using her actual golf clubs, golf balls, and golf abilities to "play a round," without visiting the course.

Recently, hybrid activities have evolved that involve some, but not all, of the physical game play field associated with the original sport. Traditional "driving range" practice area for golf has been enhanced to offer games using real golf balls and real golf clubs. Passive and active tracking systems accurately report the position of the golf ball thereby enabling automated scoring of the game or activity, which reduces the activity's burden on the user, thus increasing the appeal and entertainment value of the activity. Special care must be taken to enable the software to accurately correlate the view of the user in the simulation with the view of the user of the actual playing field. The resulting activity takes a fraction of the time typically required for the original sport, can be powerful as an instructional tool, and reduces the barriers to playing the game.

However, these systems typically limit the "interactive" component of the activity to the computer and graphics-driven simulation. This is a result of the fundamental design of the simulation (for projection on flat video monitors or projection screens). There is no ability to synchronize and control embedded or projection-mapped images across the full expanse of the playing field in reaction to the actions of one or more end-users. Importantly, providing a shared, reactive and immersive game play that occurs on-screen and in-field offers the opportunity for a community-based game involving players stationed throughout the facility. The invention disclosed herein is focused on solving such long-felt needs and providing the techniques to thereby fulfill those needs.

It is therefore desirable to provide an immersive and reactive game play range, system and process.

It is further desirable to provide an immersive and reactive game play range, system and process providing a dynamic range surface and/or end-of-range display positioned at or near a terminal end of a field of play in order to significantly enhance the appeal and entertainment value of the activity and to enable completely novel objectives and games not possible with a static, three-dimensional physical field.

It is still further desirable to provide an immersive and reactive game play range, system and process having a dynamic range surface and/or a dynamic, end-of-range display that provide for a partially simulated environment with a shared field of play for the activity that allows for an immersive but shared view of each participant and the other participants, and further expands participation by combining the advantages of simulated display with a physical field of play.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

In general, the invention relates to an immersive and reactive game play range, system and process that integrates a dynamic, interactive range surface and a dynamic, interactive end-of-range display configured to simultaneously display flight paths of multiple balls struck from a multi-level driving range. The invention can include a system of embedded and/or projection-mapped images onto a large, multi-user game environment that corresponds to a simulated activity, such as a game or sporting event, and allows multiple users to play on the same field but does not require the user(s) to be engaged in the same activity.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION OF THE INVENTION

Figure 1:
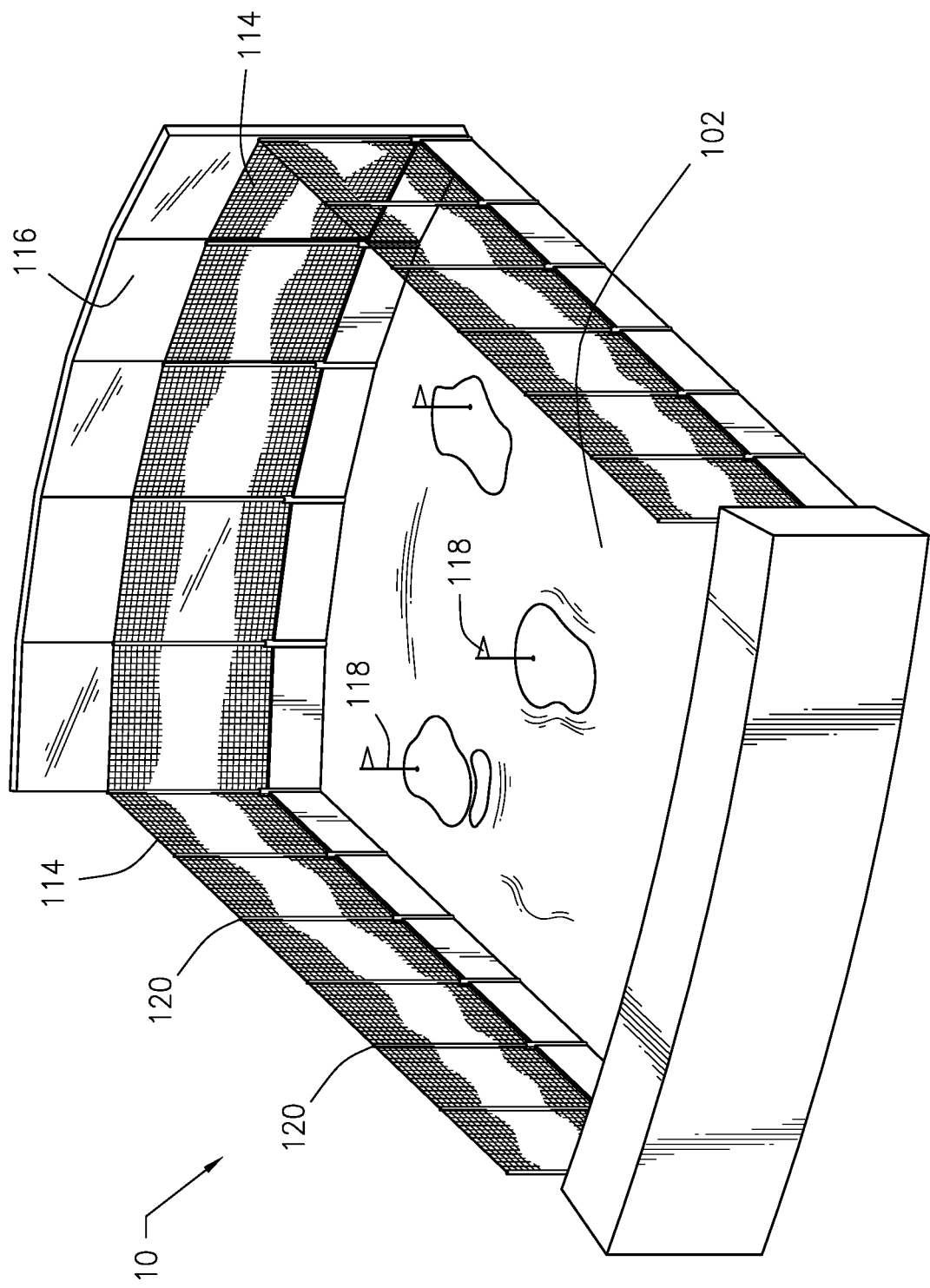
FIG. 1 illustrates a perspective view of an example of a golf and entertainment facility having a dynamic, interactive range surface and a dynamic, interactive end-of-range display positioned behind a terminal net in accordance with an illustrative embodiment of the invention disclosed herein.
Figure 2:
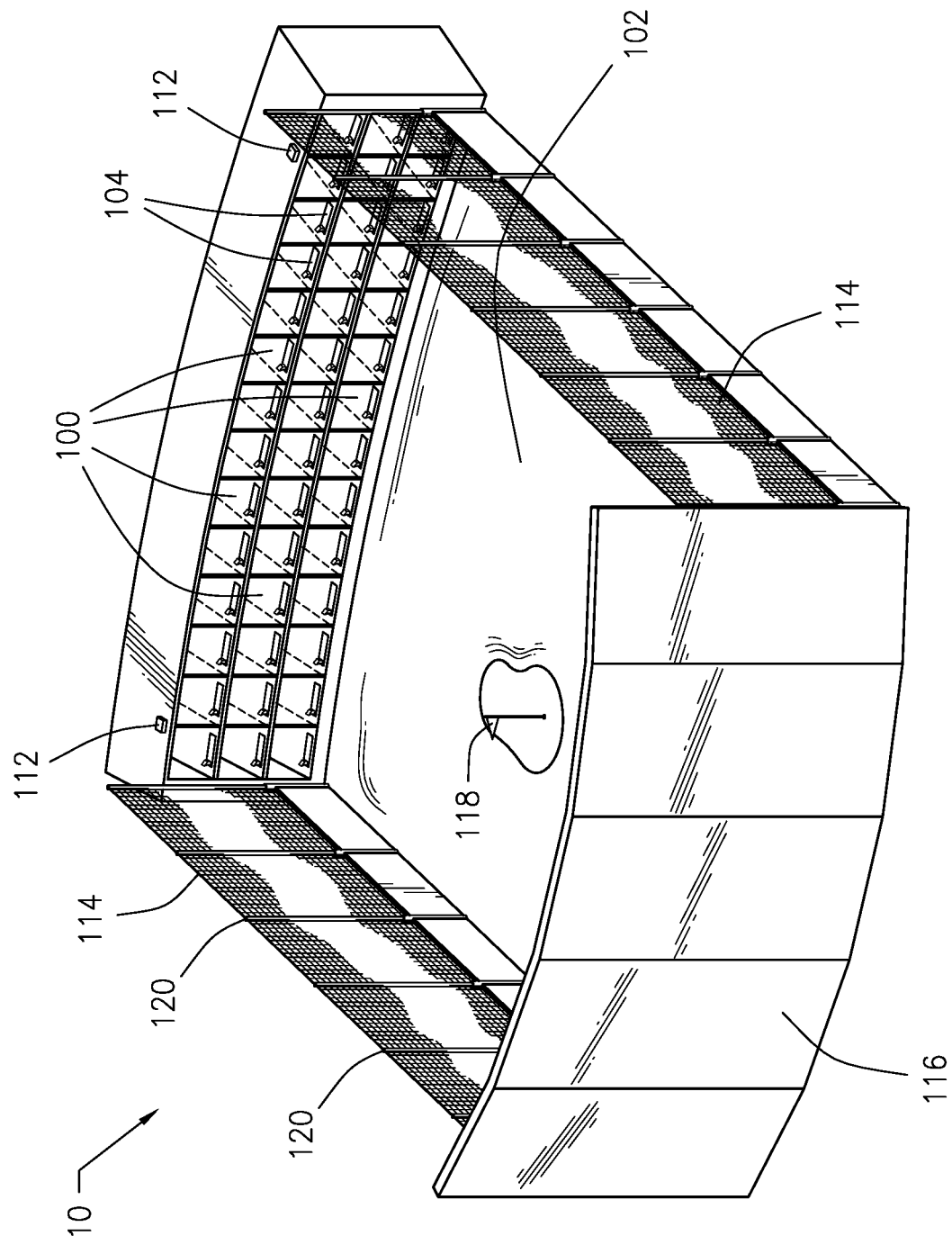
FIG. 2 is another perspective view of the golf and entertainment facility shown in FIG. 1.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

The invention generally relates to an immersive and reactive game play, range system and process having a dynamic range surface and/or end-of-range display positioned at or near a terminal end of a field of play in order to significantly enhance the appeal and entertainment value of the activity and to enable completely novel objectives and games not possible with a static, three-dimensional physical field. The dynamic range surface and/or a dynamic, end-of-range display provide for a partially simulated environment with a shared field of play for the activity that allows for an immersive but shared view of each participant and the other participants, and further expands participation by combining the advantages of simulated display with a physical field of play. In particular, the interactive range surface provides a visual, auditory and/or physical effect to a ball traveling over or landing on the range surface, and the end-of-range display is configured to display the continued flight path of the ball.

The immersive and reactive game play range, system and process is provided to simultaneously and dynamically display flight paths of multiple balls struck from a bay station in a sporting and entertainment facility. The bay stations may be located on a single story/level or on multiple stories/levels. The invention can include a system of embedded and projection-mapped images onto a large, multi-user game environment that corresponds to a simulated activity, such as a game or sporting event. While the range and the field of the immersive and reactive game play system and process is illustrated herein as a driving range configured for golf, it will be understood that the game play system and process can be configured for a variety of rules, formats, and game-play environments and sports, such as golf, soccer (goal kicks, shootouts), football (field goals, throws), basketball, shooting and/or arcade games, etc. Multiple types of sports could be combined into a single game (e.g., skeet shooting at golf balls hit from other bay stations). The game play environment can be configured for individual free-play, game play between multiple players in a single bay station or game play between multiple players in multiple bays (or even by bay station level, e.g., first floor vs. second floor). Moreover, the system and process allows multiple users to play on the same field but does not require the user(s) to be engaged in the same activity, and the game play environments can be synced between with player activities. The games could be timed or have a shot count, and the games could start/stop by bay station or by player. In addition, the user receives feedback from the simulated environment and the physical environment, and the game play environment and the bay stations allow for gallery participation and real-time feedback (social media, commentary, good shot! etc.).

In addition to simultaneous play, the range, system and process may allow for a mix of simultaneous and sequential play of games. In an embodiment involving a simulated round of golf, a large format view of the field of view provides all players with additional context and a sense for competitive position, even as they plan and execute their respective shots. The system and process provide for near-simultaneous play when relevant and sequential play when expedient. For example, with a tee shot the position players is common to all players. The large-format display enhances the mutual utility of the game by creating real-time competition. As each shot is hit, the track is displayed side by side with that of the other player. Unique perspectives required by players hitting from different tee boxes would be activated in sequence. As that player is activated in sequence, the displayed perspective would shift to the player farthest from the hole, with the position of all other players' shot positions displayed, and the trajectory of all prior players' shots shown in the air. Each player could plan their successive shot based on the success or failure of the player with the prior shot.

Referring now to the figures of the drawings, wherein like numerals of reference designate like elements throughout the several views, each bay station 100 in a golf and entertainment facility 10 is positioned behind a physical range surface 102 for game play. Each bay station 100 contains a striking, hitting or throwing zone 104, a ball dispenser 106, a game display(s) 108, programmable lighting (not shown), and/or an in-bay sensor system 110. The ball dispenser 106 is an in-bay ball storage device that dispenses balls at the user's request. The ball dispenser 106 can include a ball reader (not shown) configured to dispense the ball directly to the striking, hitting or throwing zone 104 or into an auto-tee (not shown) in the bay station 100. The ball reader can include one or more sensors that read a unique identifier via Bluetooth, RFID, visual inspection, or the like of the ball. The in-bay sensor system 110 is a sensor system providing striking/hitting-impact or throwing trigger event as well as initial launch parameters—ball speed, vertical angle, horizontal angle, and impact timestamp. The in-bay sensor system 110 may provide measured or estimated ball spin data as well as estimated trajectory information. Depending on the configuration, the in-bay sensor system 110 may be positioned in the striking, hitting or throwing zone 104, above the striking, hitting or throwing zone 104, or behind the striking, hitting or throwing zone 104 of the bay station 100.

The bay station 100 may also include the auto-tee, which is a programmable and adjustable height tee system integrated into the striking, hitting or throwing zone 104 and integrated with the ball dispenser 106 in the bay station 100. The auto-tee is controllable via software or physical buttons. The ball may be dispensed to the striking, hitting or throwing zone 104 directly from the ball dispenser 106 in response to a request by the user. In this configuration, the ball is released from the ball storage device, read using the ball reader, and then the ball is dispensed from an outlet the player in the striking, hitting or throwing zone 104.

During usage, the user will select a game or activity on the display 108 (e.g., heads-up display, touchscreen or the like) located in the bay station 100. In addition to game or activity selection, the display 108 shows individual player views, shots/balls in flight, recommended next shot/action, virtual game play environment, etc. A range visualization system loads the specific game or activity desired by the user. The ball will be dispensed from the ball dispenser 106 to the striking, hitting or throwing zone 104 in the bay station 100. When the ball is distributed to the user, the user will strike, hit or throw the ball to complete an objective of the game, sport, or activity. The ball's travel path (or lack thereof) will be tracked by the in-bay sensor system 110 and/or a range sensor system 112.

The range sensor system 112 can be positioned in the bay station 100, integrated into or on the ball, on the range surface 102, integrated into the range surface 102, and/or around the range surface 102. The range sensor system 112 is a system capable of measuring shots by fusing multiple overlapping sensor data streams into a three-dimensional volume representing the range surface 102. Flight trajectory data is available immediately (hundreds of milliseconds) after trigger events. The range sensor system 112 is configured to simultaneously measure 100+ trajectories from each of the bay stations 100 in real-time. The range sensor system 110 can include multi-sensor radars, multi-camera vision, ground impact sensors, and/or a fusion of multiple sensor systems.

The physical range surface 102 extends from in front of the bay stations 100 and is bounded by a protective netting 114 and an end-of-range dynamic and interactive display 116. The inventive range, system and process includes any hardware required to display a flight path over the range surface 102, contact with the range surface 102 upon landing, and/or the continued flight path of the ball after the ball hits the netting 114 or the end-of-range display 116. The range surface 102 is the terrain portion of the range, which may contain one or more physical targets 118 and is enclosed by the netting 114. The end-of-range display 116 is positioned behind the netting 114 at a terminal end of the range surface 102, and can be configured to display the continued flight path of the ball after the ball hits the netting 114 or other aspects of the game play environment. The end-of-range display 116 can be a suitable projection display 117 or other display, such as LED or OLED, and can display a shared playing field and show the ball in flight for multiple simultaneous users. The end-of-range display 116 and the terminal netting 114 can be mapped to a virtual target in the game play software and a range visualization system. Moreover, the protective netting 114 is supported by a series of support poles 120, and the netting 114 and/or poles 120 may also include physical targets (not shown) and/or may As illustrated in FIG. 4, the support poles 120 can include a series of controllable lights 122, and the range can also include at least one interactive range side surfaces or walls 124 intermediate of the poles 120 in order to extend separate or complementary virtual targets or effects from the range surface 102.

The physical targets 118 are structures on the range surface 102, the netting 114 or elsewhere that are electronically mapped as a virtual target in the range visualization system. All or a portion of the physical targets 118 can be stationary or mobile, and the physical targets 118 can include a ball reader for tracking shots.

Range surface 102 effects can also be driven from real-time video, pre-recorded sequences, as well as disc-jockey/video-jockey inputs. Embedded, digitally controlled lights 107, video projection devices 109, and/or other reactive surfaces may be located along the netting 114 and/or support poles 120 and/or physical targets 118 to provide game play objects 111 projected at least on the range surface 102. Video displays (e.g., LED or OLED) or other types of displays can be embedded within the range surface 102, the range side surfaces or walls 124, along a ceiling of the range surface 102, or outside of the range, such that they would provide specific information about the ball's final location via tracers or other visual, auditory or physical effects. In addition to lighting and video effects, physical effects on the range surface 102 may include but are not be limited to pyrotechnics, smoke or fog machines, water jets, fountains, and other special effects typically used to enhance the visual, auditory and/or physical experience. In addition, the range surface 102 can be configured for high and low light situations—day and night modes with different lighting, effects, and/or targets.

Figure 3:
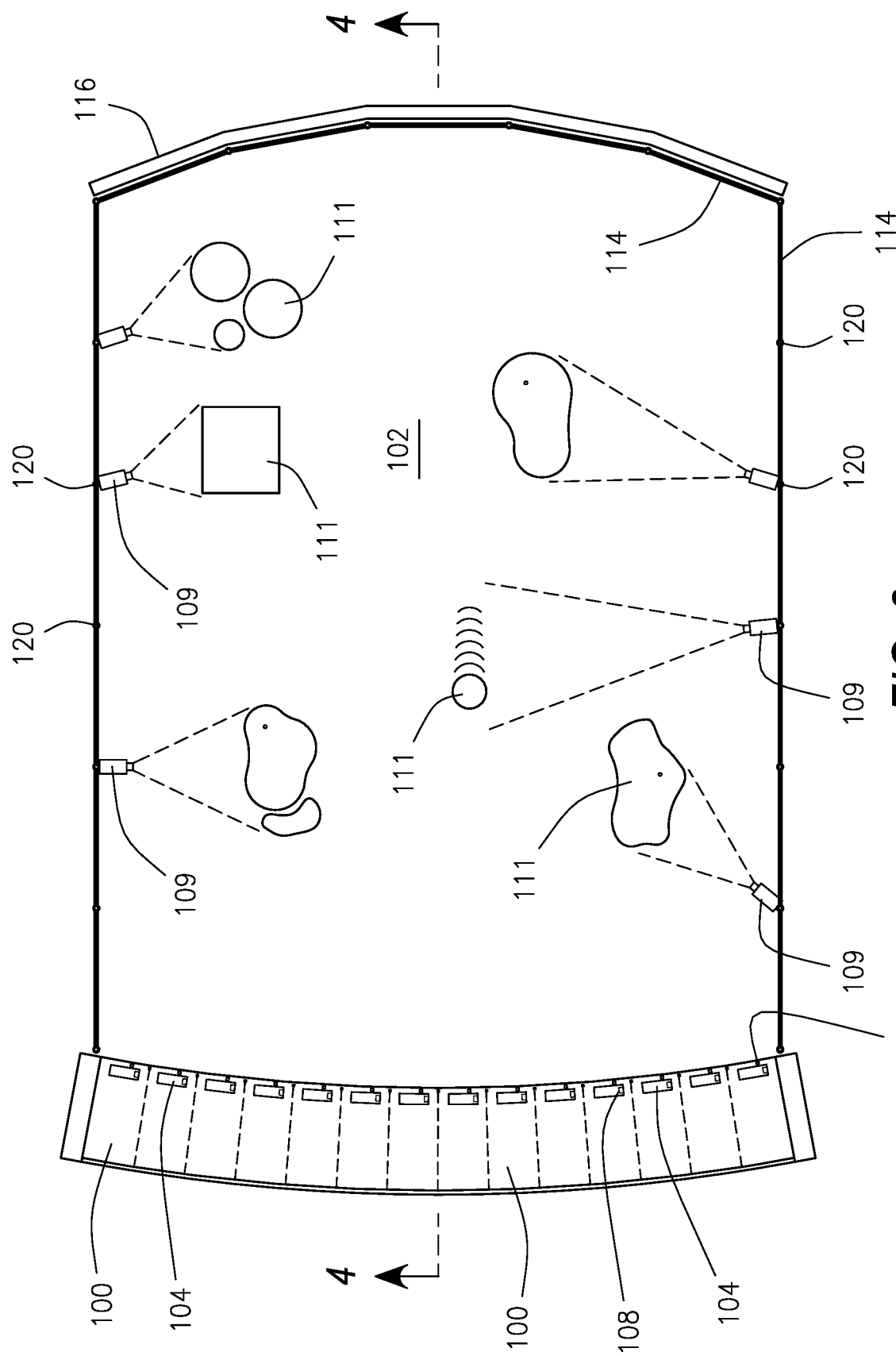
FIG. 3 is a top plan of view of an example of an interactive range surface at a golf and entertainment facility in accordance with an illustrative embodiment of the invention disclosed herein.
Figure 4:
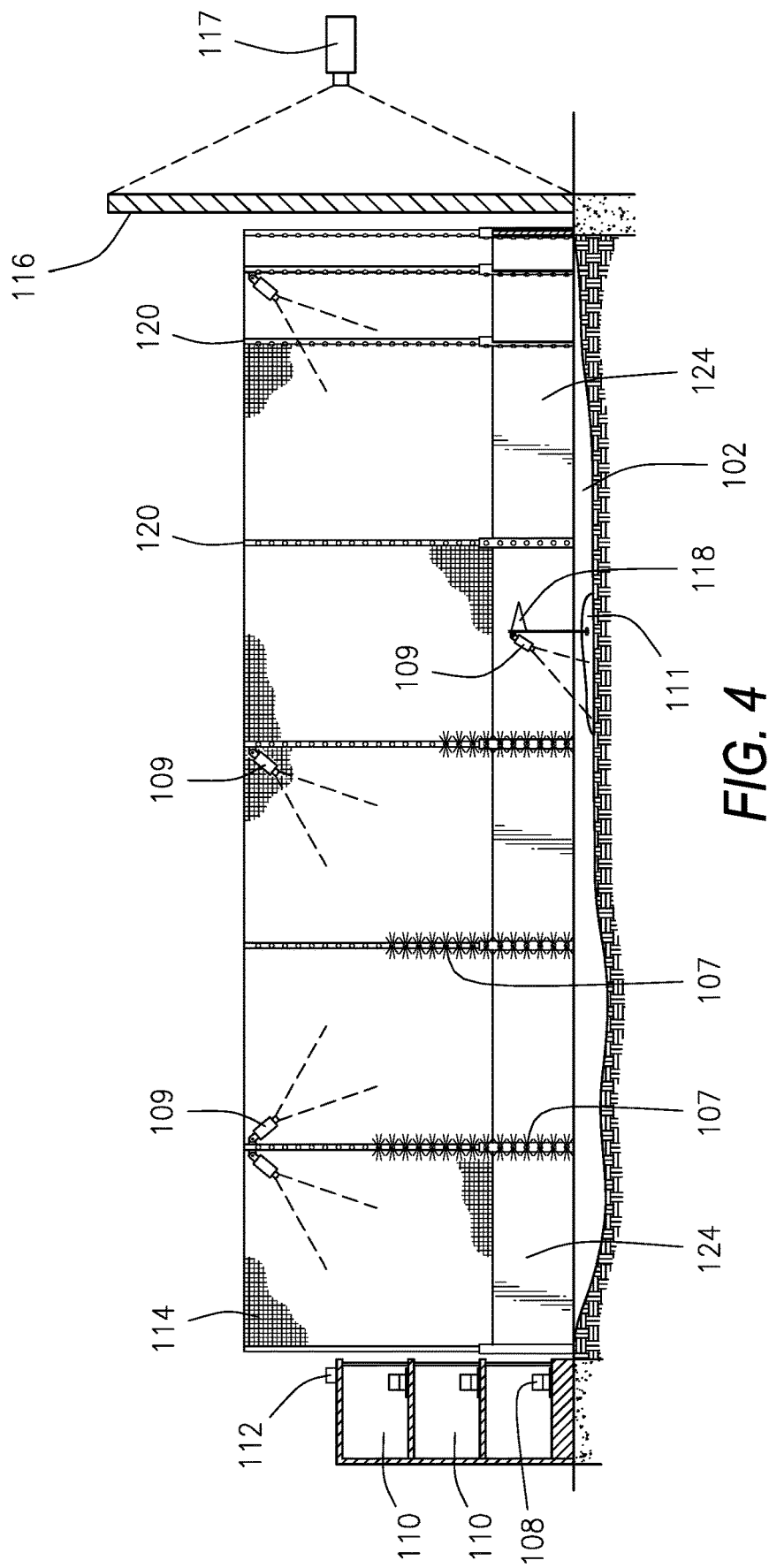
FIG. 4 is a cross-sectional view along line 4-4 of the golf and entertainment facility shown in FIG. 3 having interactive range side surfaces or walls with one or more side projectors and/or sensors.

As exemplified in FIGS. 3 and 4, the range surface 102 can have the game play objects 111 dynamically projected/mapped directly onto the surface 102 in real-time using video projection devices 109 mounted to the support poles 120 and/or the physical targets 118. Alternatively, as exemplified in FIG. 5, the range surface 120 can include a series of controllable light strips 600 positioned on the range surface. The light strips 600 can have a plurality of light-emitting diodes or other lighting mechanism 602 that can illuminate in a variety of colors. The light strips 600 are arranged along an X-axis and a Y-axis and each of the diodes 602 can be assigned a unique coordinate identifier (e.g., X1, Y1) that allows the range, system and process to illuminate a specific diode based on its position on the range surface 102. The resulting coordinate plane allows each location on the range surface 102 to be expressed as an X/Y coordinate.

Figure 5:
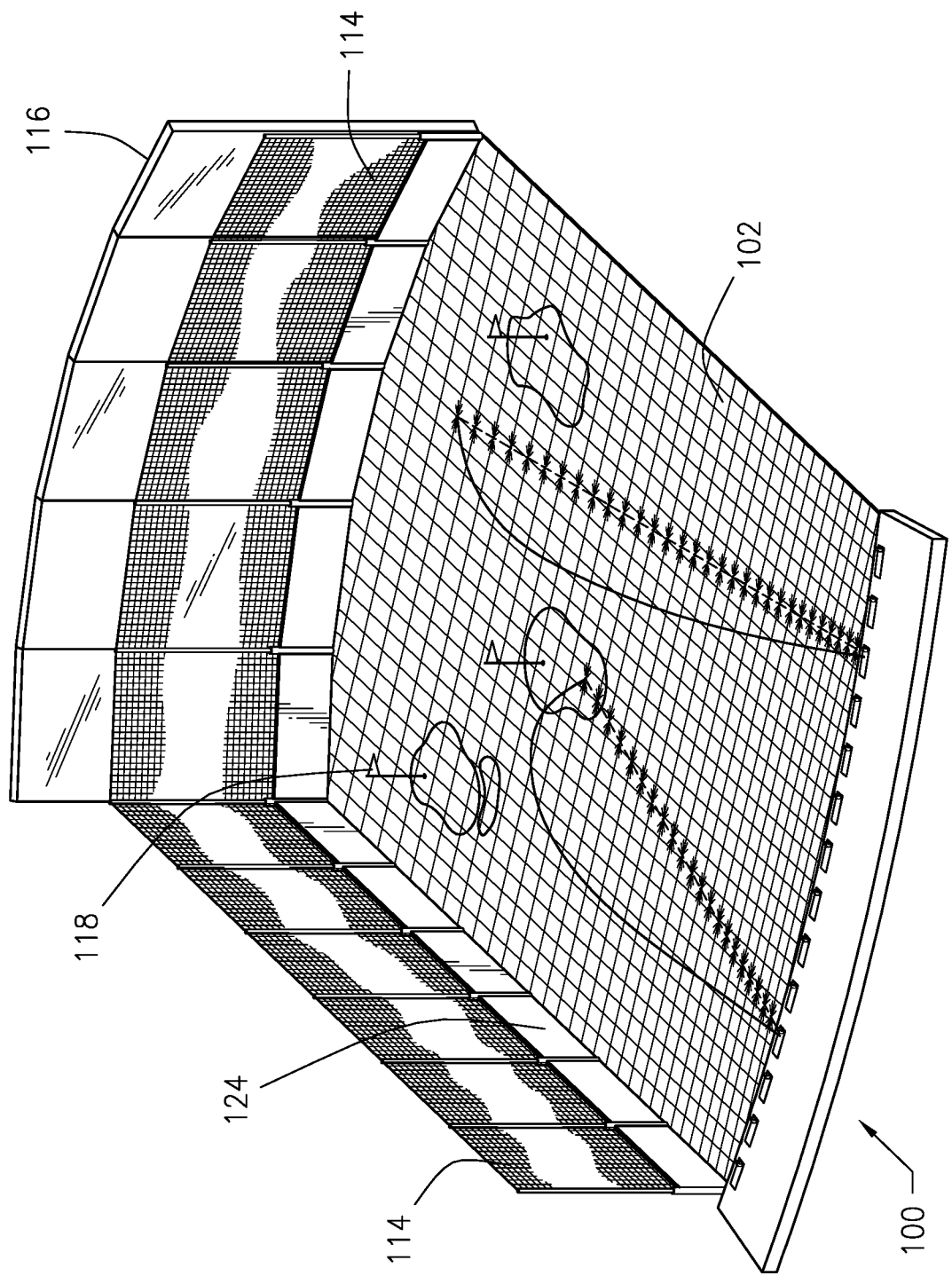
FIG. 5 is a perspective view of an example of a physical playing field having a dynamic, interactive range surface that provides a visual, auditory and/or physical effect from a golf ball struck by a user traveling over and above the range surface in accordance with an illustrative embodiment of the invention disclosed herein.
Figure 6:
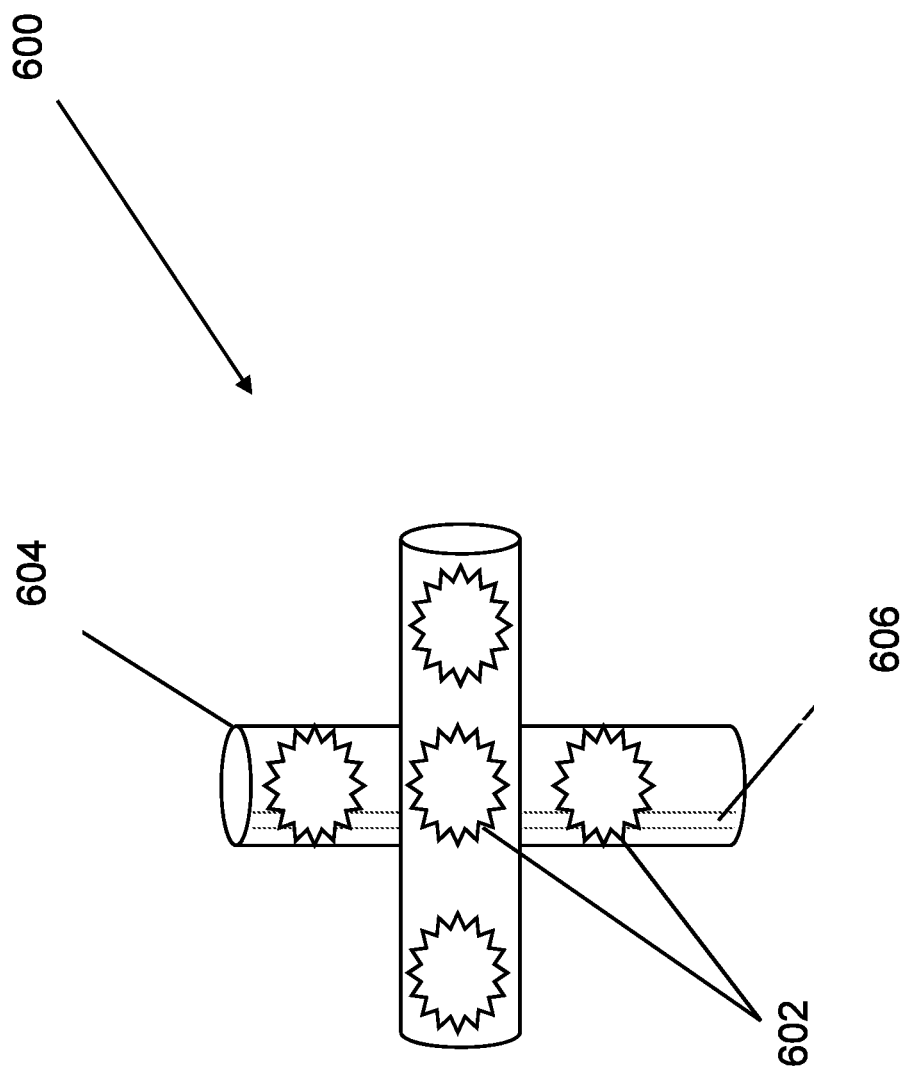
FIG. 6 is a cutaway view of an example of a light strip for a range surface in accordance with an illustrative embodiment of the invention disclosed herein.

As shown in FIG. 6, the diodes 602 can be housed within a composite plastic tubing 604, and electrical wiring 606 connects the diodes 602 to a power source (not shown). As can be seen in FIG. 5, the proximity of the diodes 602 can be closer toward the bay stations 100 and spaced further apart down the range surface 102 towards the end-of-range screen 116.

The relative coordinate positions of the diodes 602 in the light strips 600 are stored by the range visualization system 700 in a display server 702 and the ball flight coordinates (X, Y, Z and time) are stored by the range visualization system 700 in a shot database 704. The range visualization system 700 is configured to visualize game modes, scoring data, physical targets (mapped to virtual), purely virtual targets, range visualization and state, and physics simulation. Virtual targets are a virtual representation of the physical target 118 in the range visualization system 700, and the virtual targets can exist without requiring the physical target 118 on the range surface 102 (pure virtual target). In addition, the display server 702 of the range visualization system 700 handles bay state by logging users in and out, handling reserved bay time, requests for waiter, and other customer transactions. The display server 702 also receives data about and controls the game or activity so that the visual, auditory or physical effect(s) on the range surface 102 and/or in the facility and/or in the bay station 100 is appropriately correlated to the user's input and success in achieving the objective.

During use, when a ball is hit, thrown or struck by a player from one of the bay stations 100, the in-bay sensor system 110 detects a trigger event (t), and the ball flight coordinates of the ball as it flies over the range surface 102 are detected by the range sensor system 112. The range visualization system 700 aggregates game play parameters, trigger event data and ball flight coordinates from each of the sensor systems (e.g., in-bay sensor system 110 and range sensor system 112) for each of the bay stations 100. The in-bay display 108 shows a virtual game play environment that can mirror the range surface 102 or can show a completely virtualized game play environment. The range views are synchronized by the range visualization system 700 so that events being seen down the range surface 102 are displayed virtually in the bay station 100.

Figure 7:
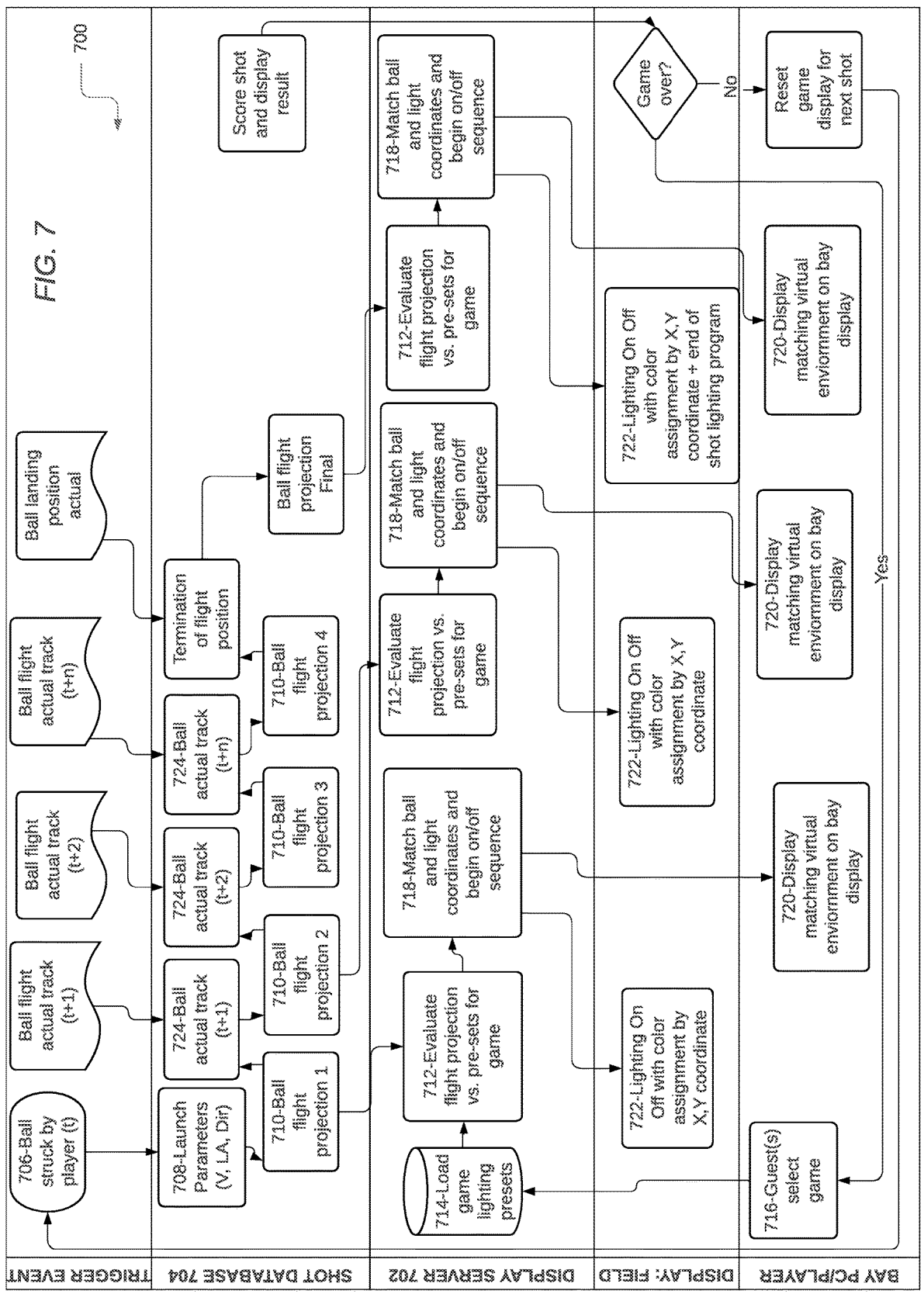
FIG. 7 is a swim lane diagram illustrating an example of processing logic for an initial launch event and game play display in accordance with an illustrative embodiment of the invention disclosed herein.

Turning now to FIG. 7, the range visualization system 700 receives a trigger event (706) at time (t) from the in-bay sensor system 110, and then the system 700 determines the initial launch parameters (708) of the ball. Based on the initial launch parameters (708), the shot database 704 determines an initial ball flight projection 710 based on launch parameters (708) at time (t). The shot database 704 electronically communicates the initial launch parameter and the initial ball flight projection to the display server 702, and the display server 702 evaluates (712) the flight projection against the game play parameters (714) selected (716) by the user. The display server 702 matches (718) ball and light coordinates and begins the on/off process sequences based on the game play parameters associated with the loaded game. The display server 702 also displays (720) the initial ball flight projection on the bay station monitor 108, including an air tracer. The display server 702 also selects (722) the individual diode by X/Y coordinate that best match the position of the ball. The display server 702 determines the specific instructions for the light strips 600 based on lighting presets that are configured and loaded (714) into the display server 702. The display server 702 may command the light strips 600 on for a predetermined amount of time (e.g., 1 ms) as the ball passes above the diode(s) 602 resulting in a tracer of the shot that would appear on the range surface 102 as the ball (e.g., FIG. 5). The foregoing processing logic is subsequently repeated for each additional trigger event (t+1, t+2, t+n) and can include actual ball flight data (724) detected by the range sensor system 112.

Figure 8:
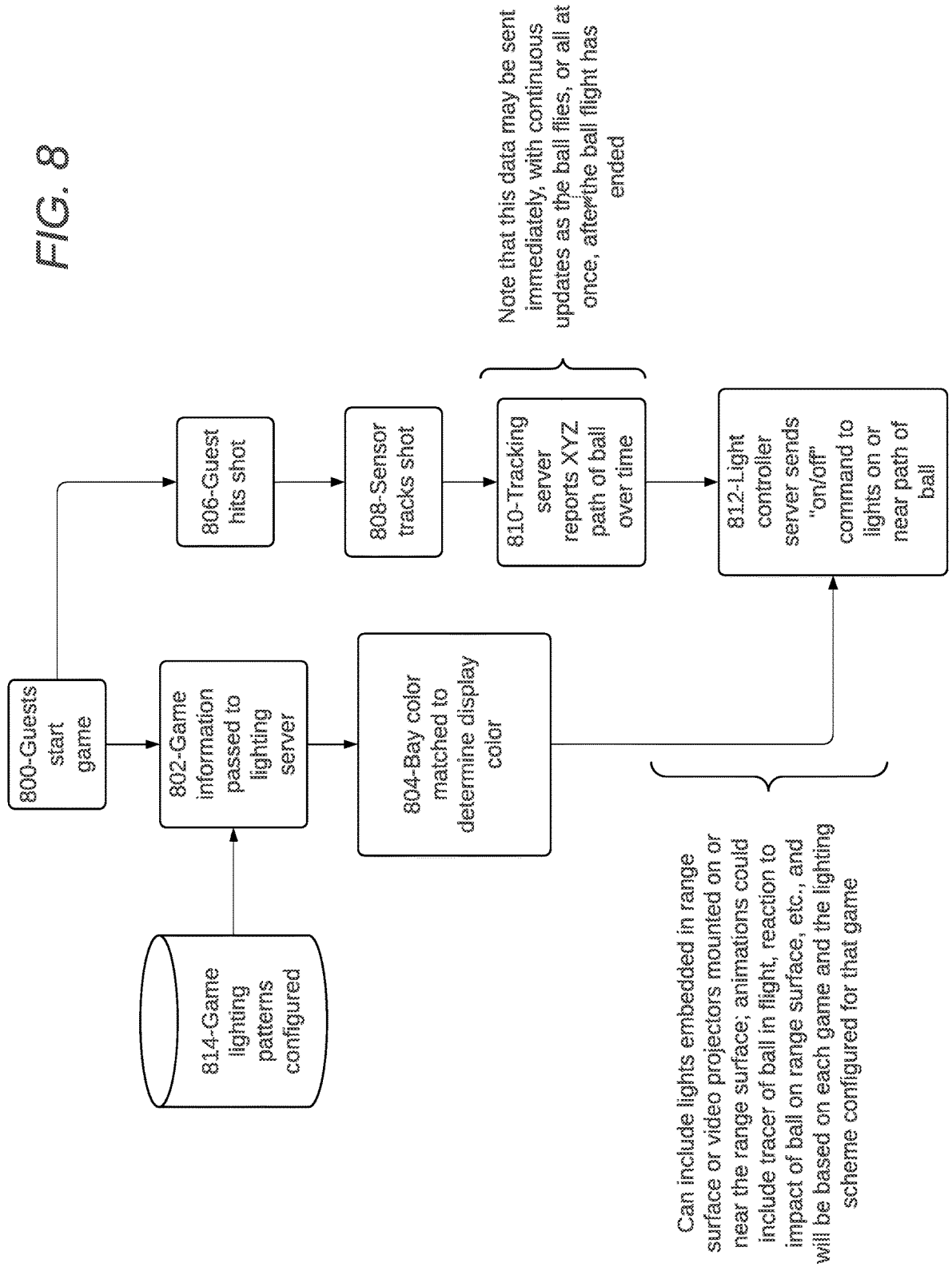
FIG. 8 is a flow chart illustrating an example of process flow in accordance with an illustrative embodiment of the invention disclosed herein.
Figure 9:
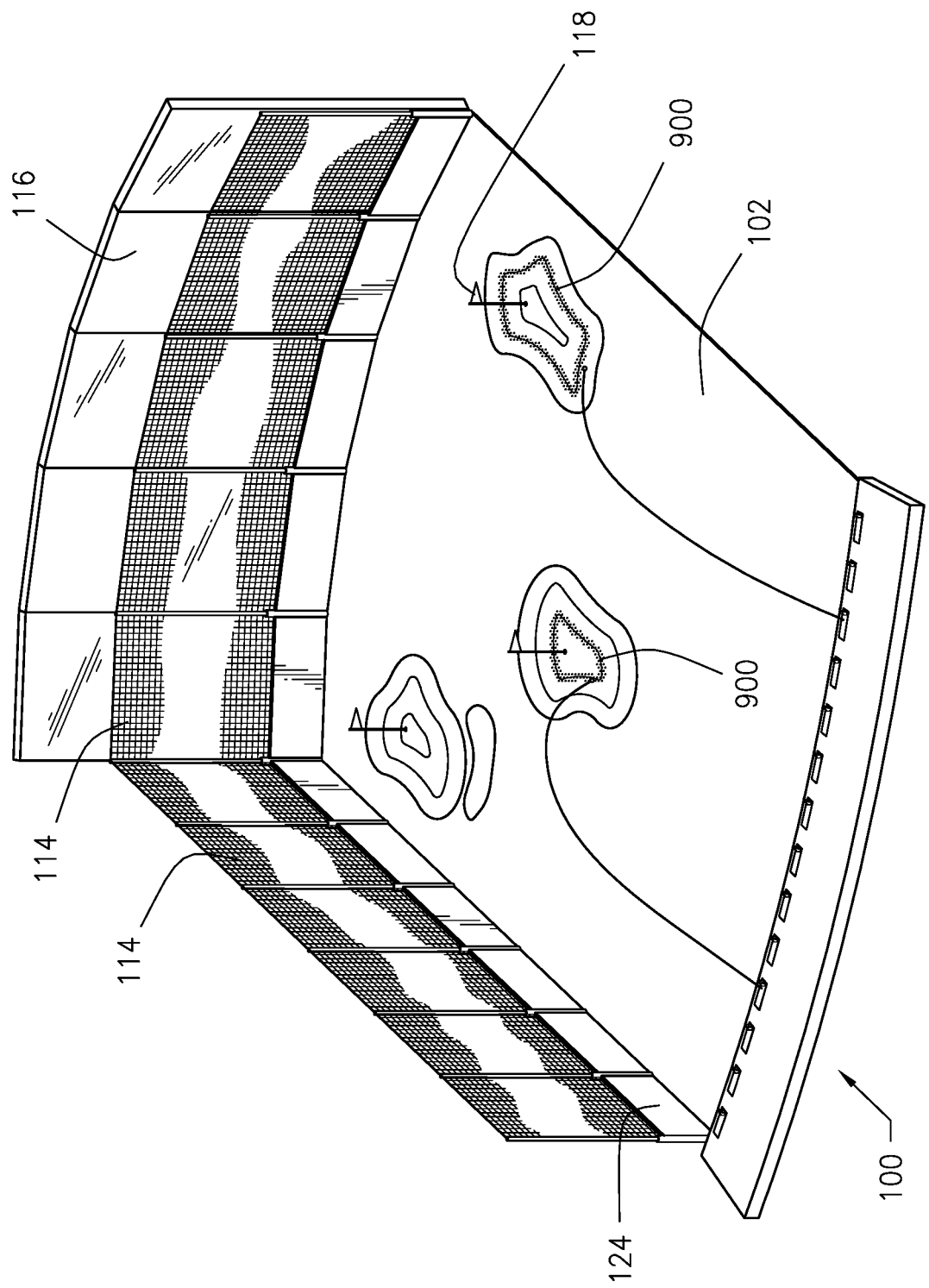
FIG. 9 is a perspective view of another example of a physical playing field having a dynamic, interactive range surface that provides a visual, auditory and/or physical effect from a golf ball on the playing field in accordance with an illustrative embodiment of the invention disclosed herein.

In addition, as shown in FIG. 8, as the ball travels to one of the physical targets 118, the range visualization system 700 can direct one or more effects to display the path of the ball on the range surface 102, for example, in a color that is unique to that user or bay station 100. When the user successfully hits a target area 900, additional changes to the range surface 102, such as a rippling effect (e.g., FIG. 9), can be displayed on the target area 900. In addition, an audible reaction in the bay station 100 may be played to indicate success or failure, and the hue of the light in the bay station 100 may be changed as well.

Figure 10:
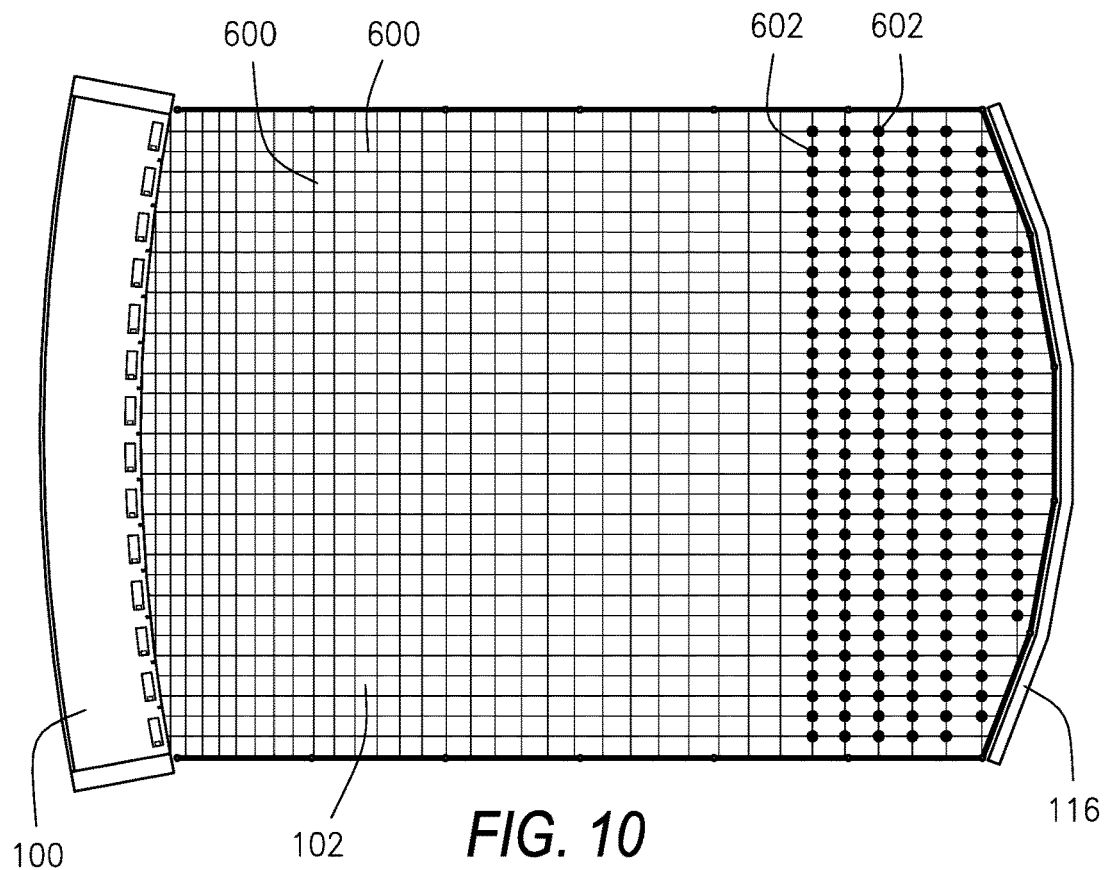
FIG. 10 is a top plan of view of an example of game play using an interactive range surface at a golf and entertainment facility in accordance with an illustrative embodiment of the invention disclosed herein.
Figure 11:
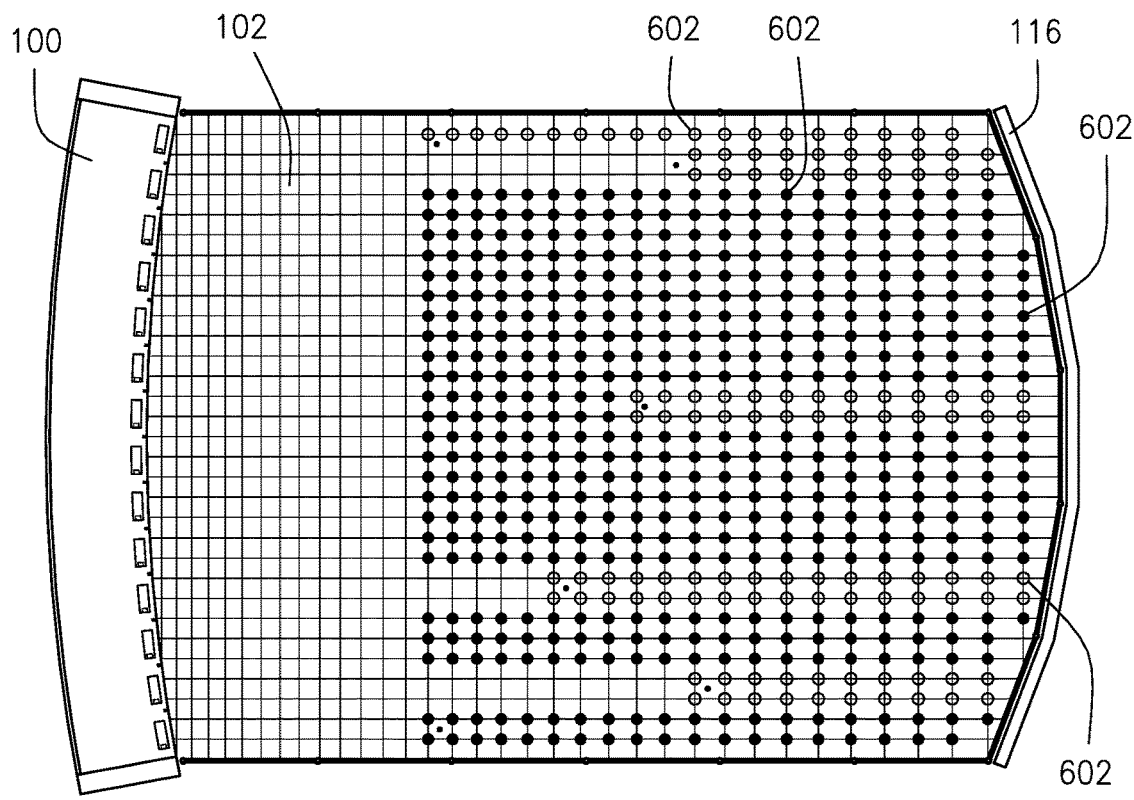
FIG. 11 is a top plan of view of game play shown in FIG. 10.
Figure 12:
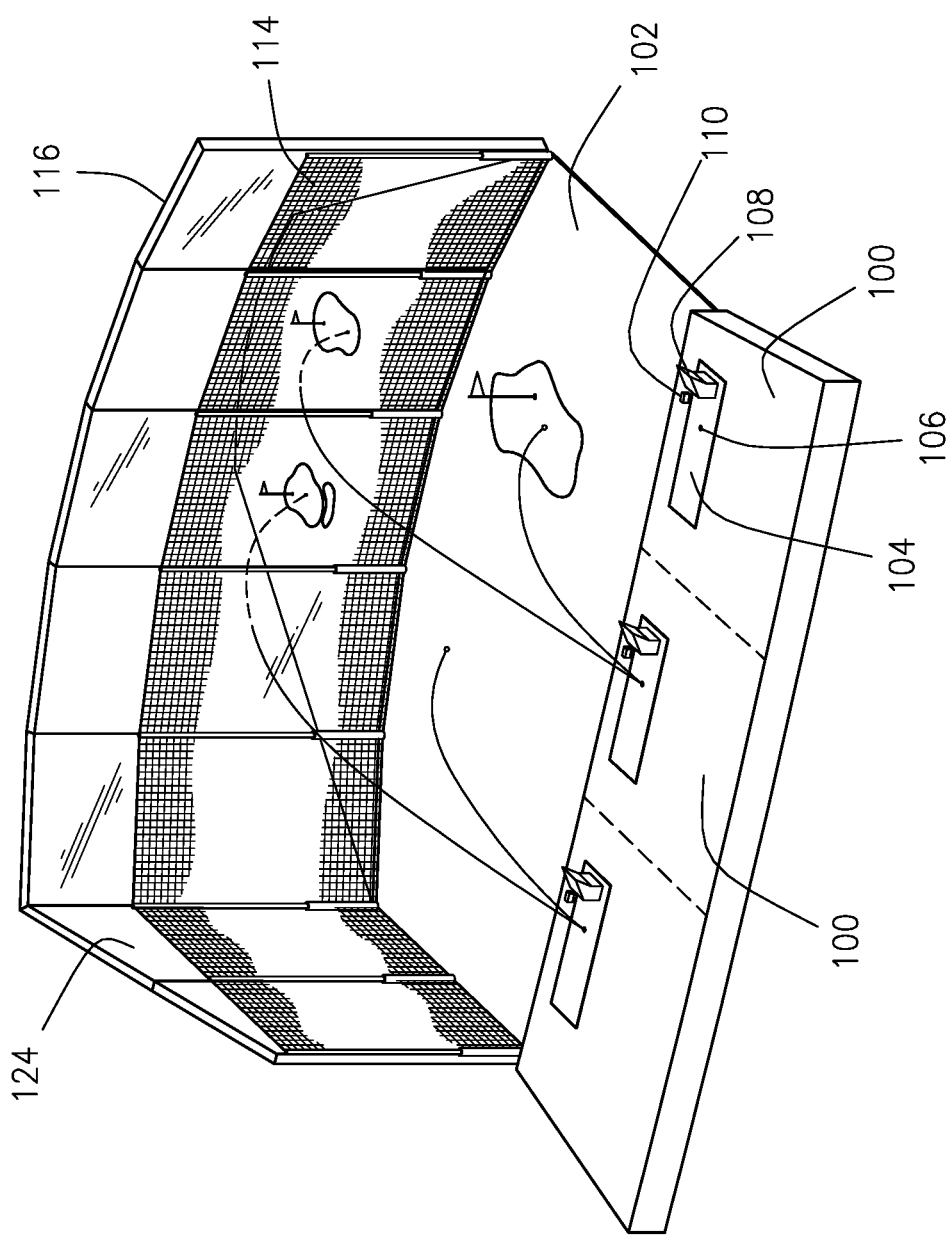
FIG. 12 is a perspective view of another example of a physical playing field having a dynamic, interactive end-of-range display positioned behind a terminal net in accordance with an illustrative embodiment of the invention disclosed herein.

Additionally, the display server 702 of the range visualization system 700 may illuminate lights to present a colorful, dynamic display to the users that is also an element of the active game. For example, as illustrated in FIGS. 10 and 11, the diodes 602 in the light strips 600 may be illuminated to represent a series of zombie-characters (solid circles) marching from the back of the range surface 102 (near the end-of-range display 116) to the front of the range surface 102 (near the bay stations 100). The display server 702 would show virtual zombies to the player in the bay station 100 on the in-bay monitor 108 and/or on the end-of-range display 116. Players would hit, throw or strike balls towards the on-coming characters, and the path of each ball would be illustrated on the range surface 102 by illuminating diodes 602 as the ball passes overhead. If the player successfully lands the ball on the range surface 102, the "zombie character" diodes 602 nearest the landing would be extinguished (clear circles), and the in-bay monitor 108 would show the zombies at the corresponding X/Y coordinates dead or they would disappear. In addition, the game play could include a "bomb" that kills zombies for a predetermined radius (e.g., 3 squares) on the range surface 102. The game play could conclude when either (i) all the zombie characters are "killed" by players hitting them with balls or (ii) the zombie characters reach the bay station 100.

As used herein, the term "computer" may refer, but is not limited to a laptop or desktop computer, or a mobile device, such as a desktop, laptop, tablet, cellular phone, smart phone, personal media user (e.g., iPod), wearable computer, implantable computer, or the like. Such computing devices may operate using one or more operating systems, including, but not limited to, Windows, MacOS, Linux, Unix, iOS, Android, Chrome OS, Windows Mobile, Windows CE, Windows Phone OS, Blackberry OS, and the like.

As used herein, the term "mobile device" may refer, but is not limited to any computer, as defined herein, that is not fixed in one location. Examples of mobile devices include smart phones, personal media users, portable digital assistants, tablet computers, wearable computers, implanted computers, and laptop computers.

The system and process described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The systems and/or processes described herein, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as .NET and C++, a lightweight data-interchange programming language such as JavaScript Object Notation (JSON) data-interchange format over HTTP POST request/response, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each process described above and combinations thereof may be embodied in computer executable code that, when executing on one or more computing devices, performs the steps thereof. In another aspect, the processes may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

It is to be understood that were the specification or claims refer to relative terms, such as "front," "rear," "lower," "upper," "horizontal," "vertical," "above," "below," "up," "down," "top," "bottom," "left," and "right" as well as derivatives thereof (e.g., "horizontally," "downwardly," "upwardly" etc.), such reference is used for the sake of clarity and not as terms of limitation, and should be construed to refer to the orientation as then described or as shown in the drawings under discussion. These relative terms are for convenience of description and do not require that the apparatus be constructed or the process to be operated in a particular orientation.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Processes of the instant disclosure may be implemented by performing or completing manually, automatically, or a combination thereof, selected steps or tasks.

The term "process" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a process comprising two or more defined steps, the defined steps can be carried out in any order or simultaneously (except where context excludes that possibility), and the process can also include one or more other steps which are carried out before any of the defined steps, between two of the defined steps, or after all of the defined steps (except where context excludes that possibility).

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. An immersive and reactive game play range, comprising:
    a plurality of bay stations each having a monitor positioned therein;
    an interactive range surface extending from said bay stations, said interactive range surface comprising for a shared field of play of each of said bay stations, said interactive range surface configured to simultaneously and dynamically display visualizations of balls struck, launched, or hit from each of said bay stations;
    an interactive end-of-range display positioned along a terminal end of said interactive range surface, said interactive end-of-range display configured to provide a shared view of a game play environment to said bay stations; and
    a range visualization system in electronic communication with at least one sensor system, said interactive and shared range surface, and said interactive and shared end-of-range display, said range visualization system configured to provide a simultaneous game play, a sequential game play, or a mix of simultaneous and sequential game play to said immersive and reactive game play range, said range visualization system comprises a shot database in electronic communication with a display server, said interactive range surface, and said interactive end-of-range display in order to dynamically display active ball tracers that decay over time as additional balls are struck, launched, or hit from each of said bay stations.

2. The range of claim 1 wherein said range surface and said end-of-range display are knitted or stitched together to provide for a seamless display surface.

3. The range of claim 1 wherein said interactive range surface further comprises one or more light-emitted diode display panels.

4. The range of claim 1 wherein said interactive range surface further comprises one or more projectors for providing a plurality of projection-mapped images.

5. The range of claim 1 wherein said interactive end-of-range display further comprises one or more light-emitted diode display panels.

6. The range of claim 1 wherein said interactive end-of-range display further comprises one or more back-light projection display panels.

7. The range of claim 1 further comprising a protective transparent or translucent netting, curtain or covering positioned between said end-of-range display and said bay station.

8. The range of claim 1 further comprising at least one interactive range side surfaces or walls.

9. The range of claim 8 wherein said range surface, said end-of-range display and said range side surfaces are knitted or stitched together to provide for a seamless display surface.

10. The range of claim 9 wherein the range side surfaces and/or said end-of-range display includes a picture-in-picture display.

11. The range of claim 1 wherein said sensor system comprises an in-bay sensor system positioned within each of said bay stations and a range sensor system positioned along said range surface.

12. The range of claim 11 wherein said in-bay sensor system detects a trigger event of said ball struck, launched, or hit from each of said bay stations, and wherein said range sensor system detects ball flights coordinates of said balls flying over said range surface.

13. The range of claim 1 wherein said range visualization system electronically communicates a visual, auditory and/or physical effect of said ball traveling over or landing on said range surface or contacting said end-of-range display to said immersive and reactive game play range.

14. An immersive and reactive game play system, comprising:
    a plurality of bay stations each having a monitor positioned therein;
    an interactive range surface extending from the bay stations, the interactive range surface comprising a shared field of play for each of said bay stations, the interactive range surface configured to simultaneously and dynamically display a visualization of ball flight paths from the bay stations;
    an interactive end-of-range display positioned at a terminal end of said interactive range surface, said range surface and said end-of-range display configured to provide for a seamless display surface to the bay stations, the end-of-range display configured to provide a shared view of a game play environment to the bay stations, the game play environment comprising individual game play, game play between multiple players in a single bay station, or game play between multiple players in multiple bay stations; and
    a range visualization system in electronic communication with at least one sensor system, said interactive range surface, and said interactive end-of-range display, said range visualization system configured to provide a visual, auditory and/or physical effect to said ball traveling over or landing on said range surface or contacting said end-of-range display, said range visualization system comprises a shot database in electronic communication with a display server, said interactive range surface, and the end-of-range display to dynamically display active ball tracers that decay over time for additional ball flight paths.

15. The system of claim 14 wherein said interactive range surface further comprises one or more light-emitted diode display panels, one or more projectors for providing a plurality of projection-mapped images or a combination thereof.

16. The system of claim 14 wherein said interactive end-of-range display further comprises one or more light-emitted diode display panels, one or more back-light projection display panels or a combination thereof.

17. The system of claim 14 further comprising a protective transparent or translucent netting, curtain or covering positioned in front of said end-of-range display.

18. The system of claim 14 further comprising at least one interactive range side surfaces.

19. The system of claim 18 wherein said range surface, said end-of-range display and said range side surfaces are configured to provide for a seamless display surface.

20. The system of claim 19 wherein the range side surfaces and/or said end-of-range display includes a picture-in-picture display.

21. The system of claim 14 wherein said sensor system comprises an in-bay sensor system positioned within said bay station and a range sensor system positioned in proximity to said range surface.

22. The range of claim 1 wherein the game play environment is configured for individual game play, game play between multiple players in a single bay station, or game play between multiple players in multiple bay stations.

23. The range of claim 1 further comprising one or more physical structural targets positioned on the range surface.

24. The range of claim 1 wherein said range is a multi-level, multi-bay station and entertainment facility.

25. The system of claim 14 wherein the range visualization system is configured to provide a simultaneous game play, a sequential game play, or a mix of simultaneous and sequential game play to said immersive and reactive game play range.

26. The system of claim 14 further comprising one or more physical structural targets positioned on the range surface.

27. An immersive and reactive game play range, comprising:
a plurality of bay stations each having a monitor positioned therein;
an interactive range surface extending from said bay stations, said interactive range surface comprising for a shared field of play of each of said bay stations, said interactive range surface configured to simultaneously and dynamically display visualizations of balls struck, launched, or hit from each of said bay stations, said interactive range surface further comprising one or more light-emitted diode display panels, one or more projectors for providing a plurality of projection-mapped images, or a combination of both;
an interactive end-of-range display positioned along a terminal end of said interactive range surface, said interactive end-of-range display configured to provide a shared view of a game play environment to said bay stations; and
a range visualization system in electronic communication with at least one sensor system, said interactive and shared range surface, and said interactive and shared end-of-range display, said range visualization system configured to provide a simultaneous game play, a sequential game play, or a mix of simultaneous and sequential game play to said immersive and reactive game play range, said range visualization system comprises a shot database in electronic communication with a display server, said interactive range surface, and said interactive end-of-range display in order to dynamically display active ball tracers that decay over time as additional balls are struck, launched, or hit from each of said bay stations.

28. The range of claim 27 wherein said range surface and said end-of-range display are knitted or stitched together to provide for a seamless display surface.

29. The range of claim 27 wherein said interactive end-of-range display further comprises one or more light-emitted diode display panels, one or more back-light projection display panels, or a combination of both.

30. The range of claim 27 further comprising a protective transparent or translucent netting, curtain or covering positioned between said end-of-range display and said bay station.

31. The range of claim 27 further comprising at least one interactive range side surfaces or walls.

32. The range of claim 31 wherein said range surface, said end-of-range display and said range side surfaces are knitted or stitched together to provide for a seamless display surface.

33. The range of claim 32 wherein the range side surfaces and/or said end-of-range display includes a picture-in-picture display.

34. The range of claim 27 wherein said sensor system comprises an in-bay sensor system positioned within each of said bay stations and a range sensor system positioned along said range surface.

35. The range of claim 34 wherein said in-bay sensor system detects a trigger event of said ball struck, launched, or hit from each of said bay stations, and wherein said range sensor system detects ball flights coordinates of said balls flying over said range surface.

36. The range of claim 27 wherein said range visualization system electronically communicates a visual, auditory and/or physical effect of said ball traveling over or landing on said range surface or contacting said end-of-range display to said immersive and reactive game play range.

37. The range of claim 27 wherein the game play environment is configured for individual game play, game play between multiple players in a single bay station, or game play between multiple players in multiple bay stations.

38. The range of claim 27 further comprising one or more physical structural targets positioned on the range surface.

39. The range of claim 27 wherein said range is a multi-level, multi-bay station and entertainment facility.

40. An immersive and reactive game play range, comprising:
a plurality of bay stations each having a monitor positioned therein;
an interactive range surface extending from said bay stations, said interactive range surface comprising for a shared field of play of each of said bay stations, said interactive range surface configured to simultaneously and dynamically display visualizations of balls struck, launched, or hit from each of said bay stations;

an interactive end-of-range display positioned along a terminal end of said interactive range surface, said interactive end-of-range display configured to provide a shared view of a game play environment to said bay stations, said interactive end-of-range display further comprising one or more light-emitted diode display panels, one or more back-light projection display panels, or a combination of both; and a range visualization system in electronic communication with at least one sensor system, said interactive and shared range surface, and said interactive and shared end-of-range display, said range visualization system configured to provide a simultaneous game play, a sequential game play, or a mix of simultaneous and sequential game play to said immersive and reactive game play range, said range visualization system comprises a shot database in electronic communication with a display server, said interactive range surface, and said interactive end-of-range display in order to dynamically display active ball tracers that decay over time as additional balls are struck, launched, or hit from each of said bay stations.

41. The range of claim 40 wherein said range surface and said end-of-range display are knitted or stitched together to provide for a seamless display surface.

42. The range of claim 40 wherein said interactive range surface further comprises one or more light-emitted diode display panels, one or more projectors for providing a plurality of projection-mapped images, or a combination of both.

43. The range of claim 40 further comprising a protective transparent or translucent netting, curtain or covering positioned between said end-of-range display and said bay station.

44. The range of claim 40 further comprising at least one interactive range side surfaces or walls.

45. The range of claim 44 wherein said range surface, said end-of-range display and said range side surfaces are knitted or stitched together to provide for a seamless display surface.

46. The range of claim 45 wherein the range side surfaces and/or said end-of-range display includes a picture-in-picture display.

47. The range of claim 40 wherein said sensor system comprises an in-bay sensor system positioned within each of said bay stations and a range sensor system positioned along said range surface.

48. The range of claim 47 wherein said in-bay sensor system detects a trigger event of said ball struck, launched, or hit from each of said bay stations, and wherein said range sensor system detects ball flights coordinates of said balls flying over said range surface.

49. The range of claim 40 wherein said range visualization system electronically communicates a visual, auditory and/or physical effect of said ball traveling over or landing on said range surface or contacting said end-of-range display to said immersive and reactive game play range.

50. The range of claim 40 wherein the game play environment is configured for individual game play, game play between multiple players in a single bay station, or game play between multiple players in multiple bay stations.

51. The range of claim 40 further comprising one or more physical structural targets positioned on the range surface.

52. The range of claim 40 wherein said range is a multi-level, multi-bay station and entertainment facility.

53. An immersive and reactive game play system, comprising:

a plurality of bay stations each having a monitor positioned therein;

an interactive range surface extending from the bay stations, the interactive range surface comprising a shared field of play for each of said bay stations, the interactive range surface configured to simultaneously and dynamically display a visualization of ball flight paths from the bay stations, said interactive range surface further comprising one or more light-emitted diode display panels, one or more projectors for providing a plurality of projection-mapped images or a combination thereof;

an interactive end-of-range display positioned at a terminal end of said interactive range surface, said range surface and said end-of-range display configured to provide for a seamless display surface to the bay stations, the end-of-range display configured to provide a shared view of a game play environment to the bay stations, the game play environment comprising individual game play, game play between multiple players in a single bay station, or game play between multiple players in multiple bay stations; and a range visualization system in electronic communication with at least one sensor system, said interactive range surface, and said interactive end-of-range display, said range visualization system configured to provide a visual, auditory and/or physical effect to said ball traveling over or landing on said range surface or contacting said end-of-range display, said range visualization system comprises a shot database in electronic communication with a display server, said interactive range surface, and the end-of-range display to dynamically display active ball tracers that decay over time for additional ball flight paths.

54. The system of claim 53 wherein said interactive end-of-range display further comprises one or more light-emitted diode display panels, one or more back-light projection display panels or a combination thereof.

55. The system of claim 53 further comprising a protective transparent or translucent netting, curtain or covering positioned in front of said end-of-range display.

56. The system of claim 53 further comprising at least one interactive range side surfaces.

57. The system of claim 56 wherein said range surface, said end-of-range display and said range side surfaces are configured to provide for a seamless display surface.

58. The system of claim 57 wherein the range side surfaces and/or said end-of-range display includes a picture-in-picture display.

59. The system of claim 53 wherein said sensor system comprises an in-bay sensor system positioned within said bay station and a range sensor system positioned in proximity to said range surface.

60. The system of claim 53 wherein the range visualization system is configured to provide a simultaneous game play, a sequential game play, or a mix of simultaneous and sequential game play to said immersive and reactive game play range.

61. The system of claim 53 further comprising one or more physical structural targets positioned on the range surface.

62. An immersive and reactive game play system, comprising:

a plurality of bay stations each having a monitor positioned therein;

an interactive range surface extending from the bay stations, the interactive range surface comprising a shared field of play for each of said bay stations, the interactive range surface configured to simultaneously and dynamically display a visualization of ball flight paths from the bay stations;

an interactive end-of-range display positioned at a terminal end of said interactive range surface, said range surface and said end-of-range display configured to provide for a seamless display surface to the bay stations, the end-of-range display configured to provide a shared view of a game play environment to the bay stations, the game play environment comprising individual game play, game play between multiple players in a single bay station, or game play between multiple players in multiple bay stations, said interactive end-of-range display further comprising one or more light-emitted diode display panels, one or more back-light projection display panels or a combination thereof; and a range visualization system in electronic communication with at least one sensor system, said interactive range surface, and said interactive end-of-range display, said range visualization system configured to provide a visual, auditory and/or physical effect to said ball traveling over or landing on said range surface or contacting said end-of-range display, said range visualization system comprises a shot database in electronic communication with a display server, said interactive range surface, and the end-of-range display to dynamically display active ball tracers that decay over time for additional ball flight paths.

63. The system of claim 62 wherein said interactive range surface further comprises one or more light-emitted diode display panels, one or more projectors for providing a plurality of projection-mapped images or a combination thereof.

64. The system of claim 62 further comprising a protective transparent or translucent netting, curtain or covering positioned in front of said end-of-range display.

65. The system of claim 62 further comprising at least one interactive range side surfaces.

66. The system of claim 65 wherein said range surface, said end-of-range display and said range side surfaces are configured to provide for a seamless display surface.

67. The system of claim 66 wherein the range side surfaces and/or said end-of-range display includes a picture-in-picture display.

68. The system of claim 62 wherein said sensor system comprises an in-bay sensor system positioned within said bay station and a range sensor system positioned in proximity to said range surface.

69. The system of claim 62 wherein the range visualization system is configured to provide a simultaneous game play, a sequential game play, or a mix of simultaneous and sequential game play to said immersive and reactive game play range.

70. The system of claim 62 further comprising one or more physical structural targets positioned on the range surface.

* * * * *